United States Patent [19]
Lamb

[11] Patent Number: 5,094,581
[45] Date of Patent: Mar. 10, 1992

[54] BALE HANDLING APPARATUS

[76] Inventor: George K. Lamb, Box 340, Gruver, Tex. 79040

[21] Appl. No.: 611,542

[22] Filed: Nov. 13, 1990

[51] Int. Cl.[5] ............................................. B66C 23/54
[52] U.S. Cl. ................................. 414/24.5; 37/117.5; 37/121; 414/704; 414/724
[58] Field of Search .................. 414/704, 724, 24.5, 414/911; 37/117.5, 120, 121, DIG. 3, DIG. 12

[56] References Cited

U.S. PATENT DOCUMENTS

| | | | |
|---|---|---|---|
| 2,041,926 | 5/1936 | Herwander | 414/704 X |
| 2,387,656 | 10/1945 | Gledhill | 37/117.5 |
| 2,597,374 | 5/1952 | Richey | 414/724 |
| 2,799,412 | 7/1957 | Pilch | 414/704 X |
| 2,883,230 | 4/1959 | Miller . | |
| 3,921,837 | 11/1975 | Vandewater . | |
| 4,275,985 | 6/1981 | Schrenner . | |
| 4,327,509 | 5/1982 | Bean | 37/117.5 |
| 4,329,103 | 5/1982 | Miller . | |
| 4,403,906 | 9/1983 | Holopainen . | |
| 4,519,739 | 5/1985 | Risch | 414/724 |
| 4,635,386 | 1/1987 | Kobayasi | 37/117.5 |
| 4,803,788 | 2/1989 | Sorensen | 414/704 X |
| 4,818,005 | 4/1989 | Purser . | |
| 4,907,356 | 3/1990 | Labounty . | |

FOREIGN PATENT DOCUMENTS 1166723   7/1985   U.S.S.R. ............................. 414/24.5

Primary Examiner—Robert J. Spar
Assistant Examiner—William M. Hienz
Attorney, Agent, or Firm—Norman B. Rainer

[57] ABSTRACT

Apparatus is provided which may be added onto a conventional front-end loader having a pivoted bucket to facilitate the handling of bales such as bales of hay. The apparatus utilizes a grapple, and coupling components which interact between the grapple and the bucket in a manner whereby, when the bucket is pivoted to a lower position, the grapple automatically and synchronously swings upwardly away from the bucket, and when the bucket is pivoted to an upper position, the grapple automatically and synchronously swings downwardly toward the bucket.

6 Claims, 3 Drawing Sheets

BALE HANDLING APPARATUS

BACKGROUND OF THE INVENTION

1. Field of the Invention

This invention relates to the handling of bales of hay, and more particularly concerns a device specially suited for the handling of spirally wound cylindrical bales of hay.

2. Description of the Prior Art

The use of spirally wound bales of hay has become very popular in recent years for various reasons. Such bales may typically have a diameter of about six feet and an axial length of about five feet. However, their large size and considerable weight, often 1500 to 2000 pounds, creates special problems in their handling and transportation. Handling devices have earlier been disclosed, but most are relatively complicated, requiring complex structure and operating features not useful for purposes other than bale handling. Other devices have been created which are attachments to tractors, trucks, or other farm vehicles. These attachment devices have been generally designed to impale and transport bales. Such devices generally must be attached to the farm vehicle prior to use, and removed before the vehicle is used for other purposes. Moreover, bale impaling devices are impractical for handling loosely bound bales and small square bales, and have limited ability to manipulate bales.

A front end loader, often referred to as a bucket loader, is a widely used piece of equipment found in many commercial and industrial applications such as construction and excavating operations, and agricultural applications, including farming and livestock activities. Bucket loaders are of various sizes and configurations, but basically include a prime mover, such as a tractor or the like, having a pair of pivotably supported lift arms that are hydraulically driven to raise or lower a bucket attached to the ends of the lift arms and disposed in front of the tractor. Hydraulic cylinders are generally used to pivot the bucket about a horizonatal axis so as to move the bucket from a load receiving to a load discharging position, and vise-versa. The primary use of a bucket loader is to transfer bulk materials such as sand, gravel, earth, manure, etc. For example, bucket loaders are used in livestock operations for scooping manure from livestock pens and loading same on a spreader, while in construction operations a bucket loader may typically be used to transfer earth from a pile into a dump truck.

Due to the large investment in a bucket loader, and for other reasons, it has been common practice to adapt bucket loaders to perform operations other than the transferring of bulk materials. This practice adds versatility to the loader and thereby eliminates the need and associated costs for using separate pieces of equipment or tools to perform separate operations. Several bucket-attached devices for handling hay bales have been earlier disclosed.

On such example of a handler for round bales in disclosed in U.S. Pat. No. 4,120,405, wherein accessory structure having three spear-shaped bale engaging prongs is attached to a front-end loader. However, emplacement of the accessory structure requires that the bucket be removed, permitting the accessory structure to be directly attached to the lift arms of the loader.

Another type of round bale handler is dislcosed in U.S. Pat. No. 3,921,837, wherein a pair of forks are attached by brackets to the sidewalls of the bucket.

Yet another round bale handler is described in U.S. Pat. No. 4,329,103, wherein the bale handling device must be removed to permit conventional use of the bucket loader.

The above described bucket loader conversion units or attachments all suffer various shortcomings. Although some prior conversion units have advantages over other ones and certain ones have specific disadvantages. It can be concluded that there exists a need for an improved bucket loader conversion attachment which does not interfere with normal functions of the bucket.

A common accessory to the bucket loader is the addition of a grapple having a multiplicity of forwardly disposed teeth downwardly directed from a framework which is pivotably connected to the top of the bucket structure. A hydraulic cylinder is typically used to pivot the grapple framework about a horizontal axis in order to embrace large objects such as hay bales or compactible materia such as loose hay. The grapple may be pivoted to an upward position so as not to interfere with the operation of the bucket when handling normal bulk materials which do not require embracing. One shortcoming of grapple assemblies is that an additional hydraulic piston unit is usually required to control the raising and lowering of the grapple. Such an additional piston requires additional hydraulic valves, hoses, control lever, and hydraulic pump capacity. The cost of such additional equipment can render the retrofitting of an existing front loader with a grapple economically unfeasible.

It is accordingly an object of the present invention to provide an improved grapple apparatus adapted to mount upon the lift arms of a front end loader.

It is another object of this invention to provide a device of the aforesaid nature which does not require additional hydraulic equipment to raise and lower the grapple.

It is a further object of the present invention to provide a device of the aforesaid nature specifically adapted to grip bales of hay, and which does not need to be removed from the bucket to permit other uses of the loader.

It is still another object of this invention to provide a device of the aforesaid nature which is easy to install and amenable to low cost manufacture.

These objects and other objects and advantages of the invention will be apparent from the following description.

SUMMARY OF THE INVENTION

The above and other beneficial objects and advantages are accomplished in accordance with the present invention by bale handling apparatus adapted for use in operable joinder with the bucket of a front-end loader, said bucket being supported by paired lift arms in a manner permitting powered pivotal movement between upper and lower positions, said apparatus comprised of a grapple pivotably mounted upon said lift arms above said bucket, and coupling means interactive between said grapple and bucket whereby, when the bucket is powered to the lower position, the grapple is automatically and synchronously swung upwardly away from the bucket, and when the bucket is powered to its upper position, the grapple is automatically and synchronously swung downwardly toward the bucket.

In a preferred embodiment, the bucket may be equipped with a plurality of forwardly directed elongated blades adapted to be manipulated beneath a bale of hay or other material to be embraced by said grapple.

In anoter preferred embodiment, means may be provided to disconnect the grapple from the coupling means and to secure the grapple in an upward position, thereby allowing conventional usage of the bucket.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
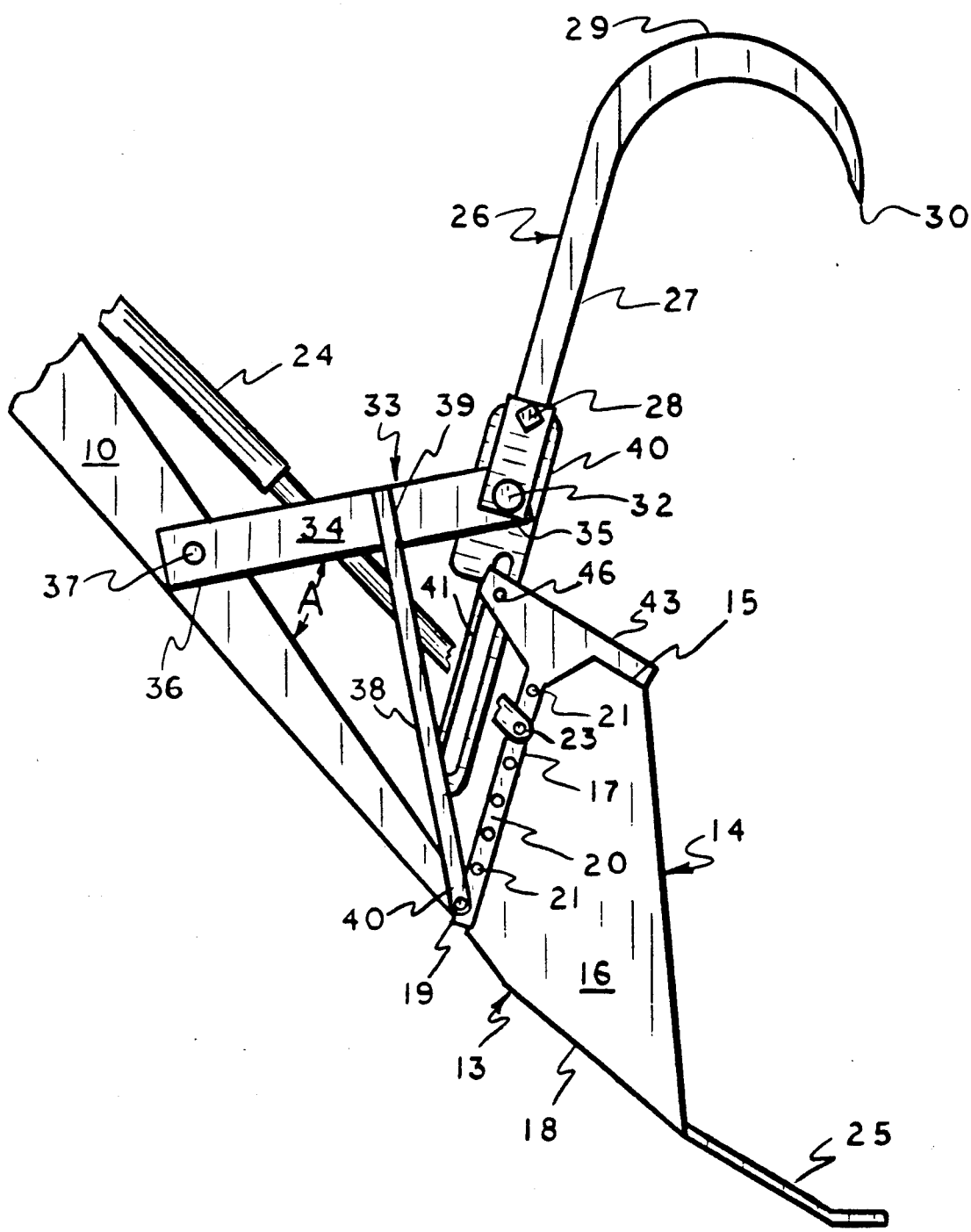
FIG. 1 is a side view of an embodiment of the device of the present invention in its open position with portions cut away to expose underlying detail.
Figure 2:
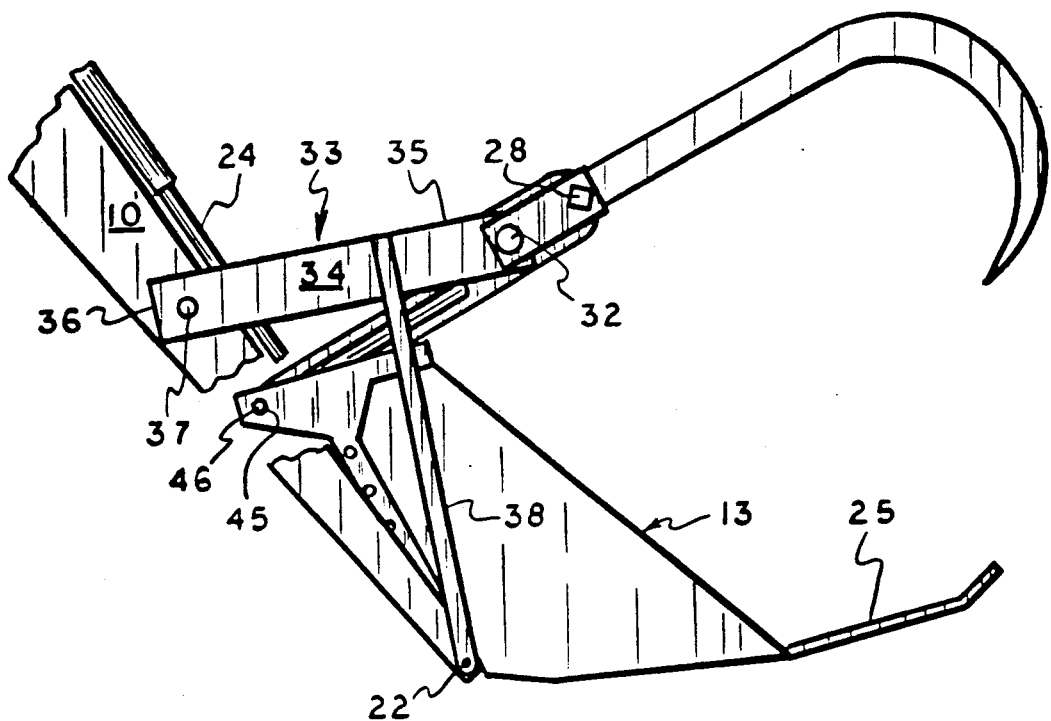
FIG. 2 is a side view of an embodiment of the device of the present invention shown in its closed position with parts cut away to expose underlying detail.
Figure 4:
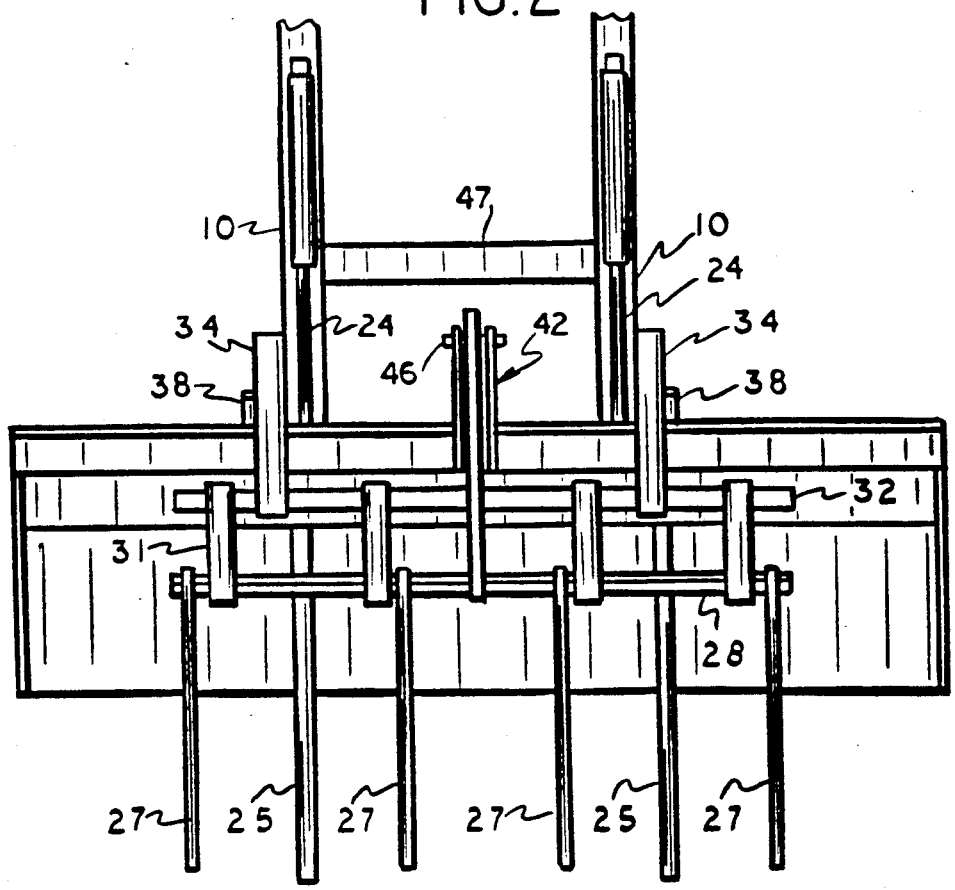
FIG. 4 is a top view of the embodiment of FIG. 2.

Referring to FIGS. 1-4, an embodiment of the bale handling apparatus of the present invention is shown associated with bucket 13 pivotably held by lift arms 10 interconnected by transverse bar 47 and supported by tractor member 11 of bucket loader 12. In all four figures, the lift arms are shown in their lowermost position.

Bucket 13 has an interior region 14 bounded in part by top panel 15, side panels 16, rear panel 17 and bottom panel 18, said panels being substantially flat and interconnected at their extremities by welding. Paired, vertically disposed ribs 20 are welded to the rear surface 19 of rear panel 17, said ribs having a series of identical circular apertures 21. A pivot pin 22 penetrates the lowermost of apertures 21 and engages the forward extremity of each lift arm 10. One of the uppermost of apertures 21 is penetrated by pivot pin 23 which engages the forward extremity of each hydraulic piston 24 disposed above each pivot arm 10. By virtue of such mode of construction and interaction with tractor member 11, bucket 13 is swung downwardly about pivot pins 22 when pistons 24 are forwardly powered, and is swung upwardly about said pivot pins when said pistons are rearwardly powered. In the exemplified embodiment of bucket 13, two forwardly directed elongated holding blades 25 are attached to the interior surface of bottom panel 18. The function of said blades will be explained hereinafter.

A grapple 26 is supported by lift arms 10 at an elevation generally above bucket 13. The exemplified embodiment of said grapple is comprised of four parallel identical arms 27 having proximal extremities that attach to horizontally disposed holding rod 28, and hook-shaped distal portions 29 that terminate in teeth 30 directed toward the interior region 14 of said bucket. Four parallel spacer bars 31 extend between rod 28 and horizontal axle 32.

Rigid grappple supporting means 33 are disposed upon each lift arm 10. In the exemplified embodiment, the grapple supporting means is comprised of first member 34 having upper and lower extremities 35 and 36, respectively, said lower extremity being attached by bolt 37 to lift arm 10, and second member 38 having upper and lower extremities 39 and 40, respectively. Lower extremity 40 of said second member is secured by pivot pin 22. Upper extremity 39 of said second member is attached to said first member in a manner to define a triangular relationship between lift arm 10, first member 34, and second member 38. The upper extremity of each first member 34 is penetrated by horizontal axle 32 of said grapple, which is thereby rotatably supported by said grapple-supporting means 33. By virtue of the aforesaid construction, grapple 26 is permitted swinging movement in a vertical path. Also, as will hereinafter be shown, the forward and upward angle of disposition of first member 34 with respect to the lift arms in their lowermost position serves to conveniently secure the grapple in a stored, out of use state. Said upward angle of disposition may range between about 5 and 30 degrees above horizontal, and is preferably between about 7 and 20 degrees above horizonatl. Stated alternatively, the fixed angle, represented as angle A in FIG. 1, between first member 34 and lift arm 10 is between about 60 and 90 degrees.

An activation lever 40 is disposed orthogonally to holding rod 28 and axle 32 adjacent the midpoints thereof, the upper portion of said activation lever fixedly embracing rod 28 and axle 32. The lower portion of activation lever 40 has an elongated slot 41 whose center axis is parallel to and coextensivde with arms 27 of the grapple.

Anchor means 42 are attached to the exterior surface of top panel 15 of the bucket, and in centered alignment with activation lever 40. In the exemplified embodiment, anchor means 42 is in the form of two mirror-image brackets 43 having facing surfaces 44 which extend to distal extremities containing circular apertures 45. The spacing between surfaces 44 is such as to receive the lower portion of lever 40 in close-fitting relationship. A linkage pin 46 penetrates circular apertures 45 and slot 41. Said activation lever 40, anchor means 42 and linkage pin 46 collectively constitute an embodiment of coupling means which achieves concerted interaction between the grapple and the bucket.

Figure 3:
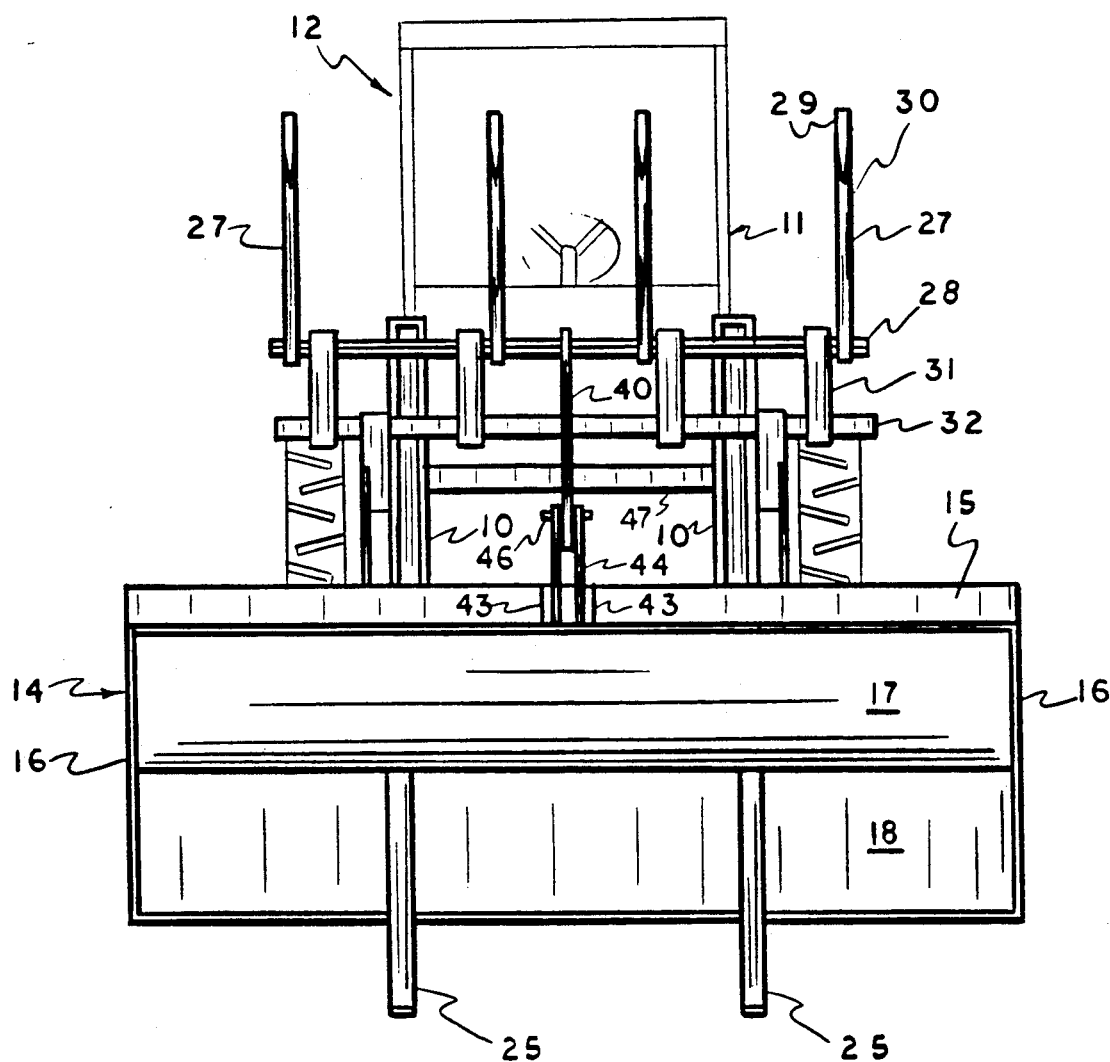
FIG. 3 is a front view of the embodiment of FIG. 1 shown in association with a bucket loader.

In operation, the bucket is powered by pistons 24 to its lower position. Such action causes the grapple to be automatically and synchronously raised. Such state is shown in FIGS. 1 and 3. The front-end loader is then driven forwardly, causing holding blades 25 to slide under a bale of hay or equivalent commodity. The pistons 24 are then powered rearwardly, causing the bucket to pivot upwardly while the grapple is automatically and synchronously pivoted downwardly to the closed state represented by FIGS. 2 and 4. In said closed state, a bale of hay is securely gripped, and can be transported by the front end loader. By reversing the action of pistons 24, the bale may be released.

When it is desired to remove the grapple from operative interaction with the bucket, linkage pin 46 is removed, and the grapple is pivoted rearwardly and upwardly about axle 32. In said inactive position, rod 28 rests securely upon first members 34.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. Bale handling apparatus adapted for use in operable joinder with the bucket of a front-end loader, said bucket being supported by paired lift arms in a manner permitting powered pivotal movement between upper and lower positions, said apparatus comprised of:
   a) a grapple comprised of parallel arms and a horizontal axle, and
   b) coupling means interactive between said grapple and bucket and comprised of:
      1) rigid grapple supporting means disposed upon each lift arm and comprised of first and second members which define a triangular relationship with said lift arm, said first members having an upper extremity penetrated by said horizontal axle and thereby rotatably supporting said grapple at an elevation above said bucket,
      2) an activation lever orthogonally affixed to said horizontal axle adjacent the midpoint thereof and having an elongated slot parallel to the arms of said grapple,
      3) anchor means attached to said bucket and extending rearwardly therefrom in alignment with said activation lever, and
      4) a linkage pin removably held by said anchor means and slidably engaging said elongated slot, whereby
   c) when the bucket is powered to its lower position, the grapple is automatically and synchronously swung upwardly away from the bucket, and when the bucket is powered to its upper position, the grapple is automatically and synchronously swung downwardly toward the bucket.

2. The apparatus of claim 1 additionally comprising a plurality of forwardly directed elongated blades attached to said bucket and adapted to pass beneath a bale.

3. The apparatus of claim 1 additionally comprising means disconnecting said grapple from operative interaction with the bucket and means for securing said grapple in an upward position, thereby allowing conventional usage of the bucket.

4. The apparatus of claim 1 wherein said bucket has a rear panel having a rear surface, and paired vertically disposed ribs attached to said rear surface and having a series of identical circular apertures.

5. The apparatus of claim 4 wherein said lift arms pivotably engage said ribs, and a powered piston pivotably engages said ribs above the site of engagement with said lift arms.

6. The apparatus of claim 1 wherein the angle formed between said first member and each of said lift arms is between about 60 and 90 degrees.

* * * * *